US009129334B2

(12) United States Patent
Nuzzi et al.

(10) Patent No.: US 9,129,334 B2
(45) Date of Patent: *Sep. 8, 2015

(54) LEVERAGING A SOCIAL NETWORK TO SEARCH FOR LOCAL INVENTORY

(71) Applicant: EBAY INC., San Jose, CA (US)

(72) Inventors: Frank A. Nuzzi, Pflugerville, TX (US); Chetan K. Patel, Austin, TX (US)

(73) Assignee: EBAY INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/155,168

(22) Filed: Jan. 14, 2014

(65) Prior Publication Data

US 2014/0129380 A1    May 8, 2014

Related U.S. Application Data

(63) Continuation of application No. 13/174,180, filed on Jun. 30, 2011, now Pat. No. 8,630,921.

(51) Int. Cl.
*G06Q 30/00* (2012.01)
*G06Q 30/06* (2012.01)
*G06Q 50/00* (2012.01)
*G06Q 30/02* (2012.01)

(52) U.S. Cl.
CPC ........ *G06Q 30/0639* (2013.01); *G06Q 30/0261* (2013.01); *G06Q 50/01* (2013.01)

(58) Field of Classification Search
USPC ................................................ 705/26.1–27.2
See application file for complete search history.

(56) References Cited

U.S. PATENT DOCUMENTS

| 2004/0153370 | A1* | 8/2004 | Yang ................................ 705/26 |
| 2006/0099964 | A1* | 5/2006 | Barrese et al. ............. 455/456.3 |
| 2008/0004888 | A1* | 1/2008 | Davis et al. ....................... 705/1 |
| 2010/0332339 | A1* | 12/2010 | Patel et al. ...................... 705/26 |
| 2011/0179064 | A1* | 7/2011 | Russo ........................... 707/769 |
| 2012/0084177 | A1* | 4/2012 | Tanaka et al. ............. 705/26.41 |
| 2012/0246012 | A1* | 9/2012 | Gower et al. ............. 705/14.69 |

OTHER PUBLICATIONS

"Keep on Truckin'?" US Fed News Service. Washington DC. Dec. 11, 2012. [recovered from ProQuest on Aug. 30, 2012].*
"Leveraging Socially Networked Mobile ICT Platforms for the Last-Mile Delivery Problem." Environmental Science & Technology. Suh et al. 2012. [recovered from ProQuest on Aug. 30, 2012].*

* cited by examiner

*Primary Examiner* — Kathleen Palavecino
(74) *Attorney, Agent, or Firm* — Haynes and Boone, LLP

(57) ABSTRACT

In accordance with one or more embodiments of the present disclosure, a method for leveraging a social network to search for local inventory includes communicating with a first mobile communication device over a network, the first mobile communication device associated with a user, and communicating with a second mobile communication device over the network, the second mobile communication device associated with a social network contact. The method further includes obtaining a geo-location of the second mobile communication device, processing a search request from the first mobile communication device, obtaining a radius of coverage for a merchant, determining whether the geo-location of the second mobile communication device is within the radius of coverage of the merchant, and providing a listing to the first mobile communication device of one or more items for sale by the merchant when the second mobile communication device is within the radius of coverage of the merchant.

20 Claims, 7 Drawing Sheets

LEVERAGING A SOCIAL NETWORK TO SEARCH FOR LOCAL INVENTORY

CROSS-REFERENCE TO RELATED APPLICATIONS

This application is a continuation of U.S. patent application Ser. No. 13/174,180, filed Jun. 30, 2011, which is incorporated herein by reference in its entirety.

BACKGROUND

In online financial transactions, customers search for and purchase products through electronic communications with online merchants over electronic networks, including mobile communication networks. During the course of these online transactions, customers may not readily know the physical location of the products or the merchants offering the products for sale or purchase consideration. Currently, mobile devices may be used to search for a local item, but if the item is not found within a GPS search radius from the mobile device, one may have to manually search for the items by checking stores via web sites, calling, and so forth.

Finding a store or product outside of a search radius would most likely be an inconvenient distance for pickup, and one may not buy the item or purchase the item online and wait. Typically, after purchase these products are shipped via mail to an address related to the customers. Sometimes, waiting for the purchased products can be inconvenient and unnecessary.

Accordingly, there currently exists a need to localize merchant searches that give the customers ready access to products and services.

SUMMARY

Embodiments of the present disclosure relate to facilitating financial transactions over a network and to location based mobile commerce. In various embodiments, systems and methods for leveraging a social network to search for local inventory include communicating with a first mobile communication device over a network, the first mobile communication device associated with a user, and communicating with a second mobile communication device over the network, the second mobile communication device associated with a social network contact. The method further includes obtaining a geo-location of the second mobile communication device, processing a search request from the first mobile communication device, obtaining a radius of coverage for a merchant, determining whether the geo-location of the second mobile communication device is within the radius of coverage of the merchant, and providing a listing to the first mobile communication device of one or more items for sale by the merchant when the second mobile communication device is within the radius of coverage of the merchant.

In another embodiment, a method includes communicating with a first mobile communication device over the network, the first mobile communication device associated with a user, and communicating with a second mobile communication device over the network, the second mobile communication device associated with a social network contact. The method further includes obtaining a geo-location of the second mobile communication device, processing a search request from the first mobile communication device, obtaining a radius of coverage for a merchant, determining whether the geo-location of the second mobile communication device is within the radius of coverage of the merchant, and providing a listing to the first mobile communication device of one or more items for sale by the merchant when the second mobile communication device is within the radius of coverage of the merchant. The method further includes requesting the social network contact to pick up the one or more items for sale from a merchant location, offering an incentive to the social network contact to accept the pickup request, receiving a purchase request for at least one item on the listing from the user via the first mobile communication device, and processing the purchase request on behalf of the user and the merchant.

These and other features and advantages of the present invention will be more readily apparent from the detailed description of the embodiments set forth below taken in conjunction with the accompanying drawings.

Figure 1:
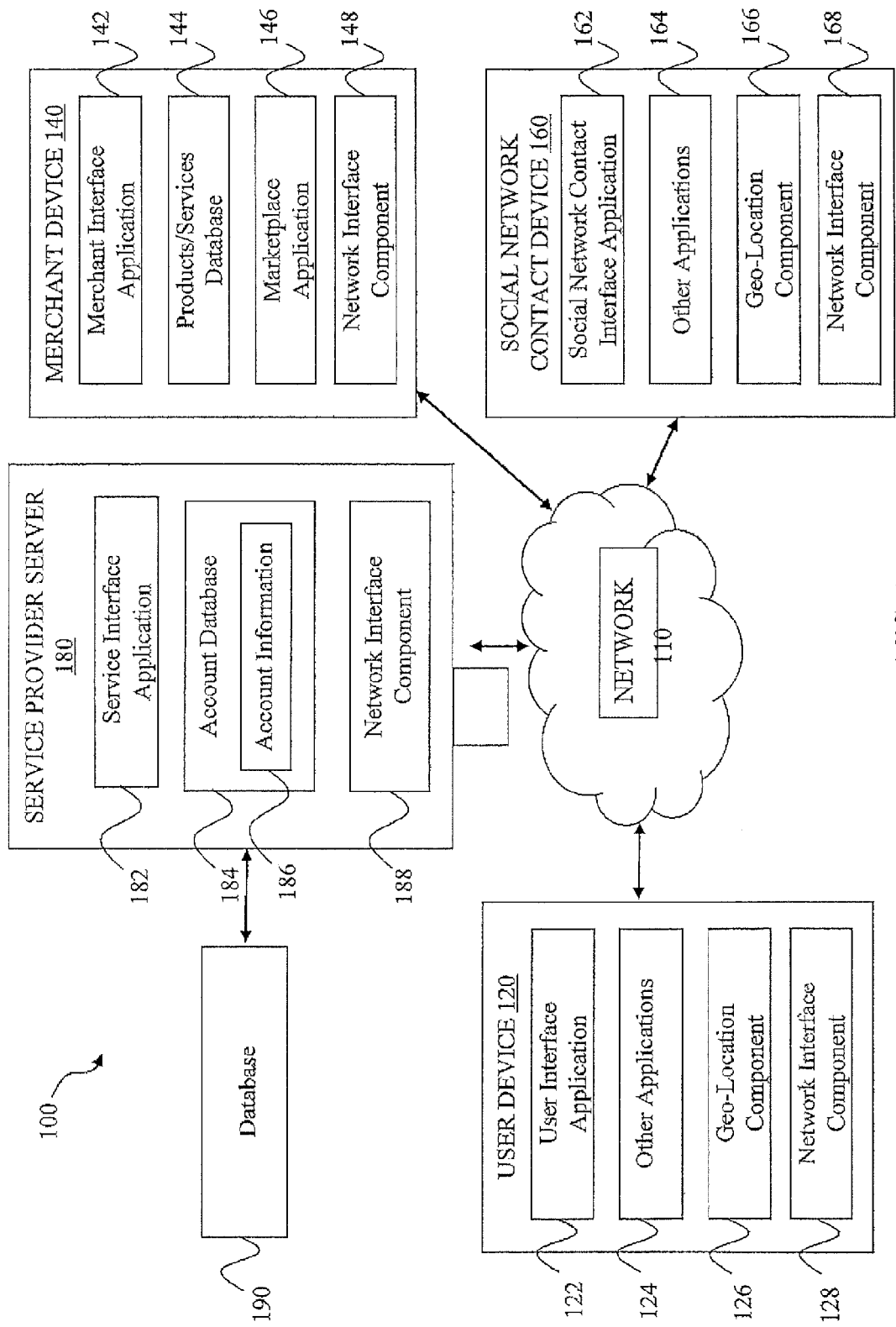
FIG. 1 shows a block diagram of a system adapted to leverage a social network to search for local inventory in accordance with an embodiment of the present disclosure.

Embodiments of the invention and their advantages are best understood by referring to the detailed description that follows. It should be appreciated that like reference numerals are used to identify like elements illustrated in one or more of the figures, wherein showings therein are for purposes of illustrating embodiments of the invention and not for purposes of limiting the same.

DETAILED DESCRIPTION

It is understood that the following disclosure provides many different embodiments, or examples, for implementing different features of the disclosure. Specific examples of components and arrangements are described below to simplify the present disclosure. These are, of course, merely examples and are not intended to be limiting. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Various features may be arbitrarily drawn in different scales for the sake of simplicity and clarity. It is noted that the same or similar features may be similarly numbered herein for the sake of simplicity and clarity. In addition, some of the drawings may be simplified for clarity. Thus, the drawings may not depict all of the components of a given apparatus (e.g., device) or method.

Various aspects of the present disclosure will be described herein with reference to drawings that are schematic illustrations of idealized configurations of the present disclosure. As such, variations from the shapes of the illustrations as a result, for example, manufacturing techniques and/or tolerances, are to be expected. Thus, the various aspects of the present disclosure presented throughout this disclosure should not be construed as limited to the particular shapes of elements (e.g., regions, layers, sections, substrates, etc.) illustrated and described herein but are to include deviations in shapes that result, for example, from manufacturing. By way of example, an element illustrated or described as a rectangle may have rounded or curved features and/or a gradient concentration at its edges rather than a discrete change from one element to another. Thus, the elements illustrated in the drawings are schematic in nature and their shapes are not intended to illustrate the precise shape of an element and are not intended to limit the scope of the present disclosure.

Unless otherwise defined, all tennis (including technical and scientific teal's) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

It will be understood that although the terms "first", "second", "third", and so on, may be used herein to describe various elements or devices, the elements or devices should not be limited by these terms. These terms are only used to distinguish one element or device from another element or device. Thus, a first element or device discussed below could be termed a second element or device without departing from the teachings of the present disclosure.

It is understood that several processing steps and/or features of a device may be only briefly described, such steps and/or features being well known to those of ordinary skill in the art. Also, additional processing steps or features can be added, and certain of the following processing steps or features can be removed and/or changed while still implementing the claims. Thus, the following description should be understood to represent examples only, and are not intended to suggest that one or more steps or features is required.

Embodiments of the present disclosure provide systems and methods for location based mobile commerce, such as by leveraging a social network to search for local inventory. Embodiments of the present disclosure provide end-to-end systems and methods for merchants to list items, products, and services that may be searched and purchased through a user based device and/or searched based on geo-location of the user's social network contacts' devices. In one implementation, merchants have the capability to create an electronic shop via a communication network, such as via a mobile communication device (e.g., a cell phone) and/or the Internet. The electronic shop may be integrated with purchase and payment options (e.g., an online payment processing service) for a user to purchase directly from the user's mobile communication device.

In another implementation, service offering of the location based mobile commerce may be optimized based on the user's geo-location and preferences and/or by leveraging the user's social network contacts and their geo-location and preferences. In one aspect, geo-location may be based on zip-code information and/or location information (e.g., longitude and latitude via global positioning system (GPS) coordinates), which may be established by the service offering. For example, the system and methods may utilize GPS information inherent in mobile communication devices or a user's manual input of GPS and/or zip-code information. A user may search for items, products, and services based on geo-location information related to merchants, the user, and/or the user's social network contacts, and the user's search results for intended items, products, and services to be purchased may be displayed as a merchant listing to the user via a mobile communication device. In one example, the user may scan a barcode of an item to search for the item in a current locality.

In another implementation, comparison shopping may be facilitated by overlaying search results with different merchants and network based shopping platforms. Advantageously, a search may be expanded by leveraging social network contacts who are willing to participate in searches and/or pick up purchased items. In one example, incentives may be offered to social network contacts for picking up items.

Merchants may interface with mapping and GPS capability inherent to mobile communication devices to monitor and track querying users. Accordingly, merchants have the capability to view potential buyers of their items, products, and services. In one aspect, merchants have the capability to generate a detailed report on searches for their items, products, and services with information related to querying statistics from different locations. For example, merchants may view which items are searched the most from which locations, and merchants may generate a report on whether increasing a radius of coverage could improve sales.

In another example, the merchant may receive notification that an item has been purchased (e.g., through a text, an email, and/or a resident client application). In another example, the merchant may manage item listing via a mobile communication device (e.g., supply chain management, inventory control, etc). These and other embodiments of the present disclosure will be described in greater detail herein.

Referring now to FIG. 1, one embodiment of a system 100 is illustrated for facilitating financial transactions over a network including leveraging a social network to search for local inventory. Location based mobile commerce may take place via system 100 including a network 110, such as the Internet via, e.g., mobile communication networks. As shown in FIG. 1, the system 100 includes a user device 120 (e.g., a client or customer device) adapted to interface with one or more merchant devices 140 (e.g., business entities proffering items, products, and/or services for purchase), one or more social network contact devices 160, and a service provider 180 (e.g., a network based financial transaction service provider, such as a payment and settlement transaction provider) over the network 110.

The network 110, in one embodiment, may be implemented as a single network or a combination of multiple networks. For example, the network 110 may include a wireless telecommunications network (e.g., cellular telephone network) adapted for communication with one or more other communication networks, such as the Internet. In other examples, the network 110 may include the Internet, one or more intranets, landline networks, wireless networks, and/or one or more other appropriate types of communication networks. As such, in various implementations, the user device 120, the one or more merchant devices 140, the one or more social network contact devices 160, and the service provider server 180 may be associated with a particular link (e.g., a link, such as a URL (Uniform Resource Locator) to an IP (Internet Protocol) address).

The user device 120, in various embodiments, may be implemented using any appropriate combination of hardware and/or software configured for wired and/or wireless communication over the network 110. In one embodiment, the user device 120 may be implemented as a mobile communication device (e.g., wireless cellular phone) adapted for communication with the network 110. In other embodiments, the user device 120 may be implemented as a personal computer (PC), a personal digital assistant (PDA), a notebook computer, and/or various other generally known types of wired and/or wireless computing devices for communication with the network 110. It should be appreciated that the user device 120 may be referred to as a client device or a customer device without departing from the scope of the present disclosure.

The user device 120, in one embodiment, includes a user interface application 122, which may be utilized by a user to conduct network based financial transactions (e.g., remote network based commerce, such as shopping, purchasing, bidding, etc.) with the one or more merchant devices 140 and/or the service provider server 180 over the network 110. For example, the user interface application 122 may be implemented as a location based mobile commerce application to initiate, track, manage, and store information related to remote network based commerce for viewing, searching, and purchasing of items, products, and/or services over the network 110. In one implementation, the user device 120 may be linked to an account with the service provider server 180 for direct and/or automatic settlement of purchase requests between the user and the one or more merchant devices 140 via the user interface application 122, in a manner as described herein.

In one embodiment, the user interface application 122 comprises a software program, such as a graphical user interface (GUI), executable by a processor that is configured to interface and communicate with the one or more merchant devices 140, the one or more social network contact devices 160, and/or the service provider server 180 via the network 110. In one aspect, the user interface application 122 comprises a browser module that provides a network interface to browse information available over the network 110. For example, the user interface application 122 may be implemented, in part, as a web browser to view and search information available over the network 110. In another example, the user is able to access merchant websites of the one or more merchant devices 140 over the network 110 to view, search, and select items, products, and/or services for purchase, and the user is able to purchase selected items, products, and/or services from the one or more merchant devices 140 via the service provider server 180. As such, the user may conduct network based financial transactions (e.g., location based mobile commerce for purchasing and proffering payment for items, products, and/or services) from the one or more merchant devices 140 via the service provider server 180.

The user device 120, in various embodiments, may include other applications 124 as may be desired in one or more embodiments of the present disclosure to provide additional features available to the user. In one example, such other applications 124 may include security applications for implementing user-side security features, programmatic client applications for interfacing with appropriate application programming interfaces (APIs) over the network 110, and/or various other types of generally known programs and/or software applications. In still other examples, the other applications 124 may interface with the user interface application 122 for improved efficiency and convenience. In one example, files, data, and/or information may be imported from various types of accounting software (e.g., a spreadsheet application) directly into the user interface application 122 for improved tracking of payments and settlements related to purchases via the network 110.

The user device 120, in one embodiment, includes a geo-location component 126 adapted to monitor and provide an instant geographical location (i.e., geo-location) of the user device 120. In one implementation, the geo-location of the user device 120 may include global positioning system (GPS) coordinates, zip-code information, area-code information, street address information, and/or various other generally known types of geo-location information. In one example, the geo-location information may be directly entered into the user device 120 by the user via a user input component, such as a keyboard, touch display, and/or voice recognition microphone. In another example, the geo-location information may be automatically obtained and/or provided by the user device 120 via an internal or external GPS monitoring component. In one aspect, when interfacing with the user device 120, the user may elect to provide or may be prompted to provide permission for the release of geo-location information. Accordingly, the user may have exclusive authority to allow transmission of geo-location information from the user device 120 to the one or more merchant devices 140 and/or the service provider server 180. In any instance, the one or more merchant devices 140 and/or the service provider server 180 may communicate with the user device 120 via the network 110 and request permission to acquire geo-location information from the user device 120 for geo-location based mobile commerce. These and other aspects of the present disclosure are described in greater detail herein.

The user device 120, in one embodiment, includes a network interface component (NIC) 128 adapted for communication with the network 110. In various implementations, the network interface component 128 may comprise a wireless communication component, such as a wireless broadband component, a wireless satellite component, or various other types of wireless communication components including radio frequency (RF), microwave frequency (MWF), and/or infrared frequency (IRF) components adapted for communication with the network 110. In other various implementations, the network interface component 128 may be adapted to interface with a DSL (e.g., Digital Subscriber Line) modem, a PSTN (Public Switched Telephone Network) modem, an Ethernet device, and/or various other types of wired and/or wireless network communication devices adapted for communication with the network 110.

The user device 120, in one embodiment, may include a user identifier, which may be implemented, for example, as operating system registry entries, cookies associated with the user interface application 122, identifiers associated with hardware of the user device 120, and/or various other appropriate identifiers. The user identifier may include one or more attributes related to the user, such as personal information related to the user (e.g., one or more user names, passwords, photograph images, biometric ids, addresses, phone numbers, etc.) and banking information (e.g., one or more banking institutions, credit card issuers, user account numbers, security data and information, etc.). In various aspects, the user identifier may be passed with a user login request or purchase request to the service provider server 180 via the network 110, and the user identifier may be used by the service provider server 180 to associate the user with a particular user account maintained by the service provider server 180, in a manner as described herein.

The one or more merchant devices 140, in one embodiment, may be implemented using any appropriate combination of hardware and/or software configured for wired and/or wireless communication over the network 110. In one embodiment, the merchant device 140 may be implemented as a mobile communication device (e.g., wireless cellular phone) adapted for communication with the network 110. In other embodiments, the merchant device 140 may be implemented as a network server, a personal computer (PC), a personal digital assistant (PDA), a notebook computer, and/or various other generally known types of wired and/or wireless computing devices for communication with the network 110.

In another embodiment, the one or more merchant devices 140 may be maintained as one or more network servers by one or more business entities (e.g., merchant sites, resource information sites, utility sites, real estate management sites, social networking sites, etc.) offering various items, products, and/or services for purchase and payment, which may need registration of user identity information as part of offering the items, products, and/or services to one or more users over the network 110. Accordingly, each of the one or more merchant devices 140 may comprise at least one network based server in communication with the network 110 having a merchant interface application 142, a products/services database 144, and a marketplace application 146 for presenting and identifying one or more available items, products, and/or services for purchase via the network 110, which may be made available to the user device 120 for viewing and purchase by the user. In one aspect, each of the network based merchant servers may be accessible via a mobile communication device (e.g., wireless cellular phone) for management purposes. For example, each merchant entity has the ability to access and interact with their own network based merchant server via a mobile communication device to manage merchant parameters, item listings, radius of coverage, user search statistics, etc., and to generate reports related thereto.

In one embodiment, each of the merchant devices 140 includes the merchant interface application 142, which may be utilized by the one or more merchant devices 140 to conduct network based financial transactions (e.g., remote network commerce, such as shopping, purchasing, bidding, etc.) with one or more users and/or the service provider server 180 over the network 110. For example, the merchant interface application 142 may be implemented as a location based mobile commerce application to initiate, track, manage, and store information related to remote network based commerce for the viewing, searching, and purchasing of items, products, and/or services over the network 110. In one implementation, each of the merchant devices 140 may be linked to an account with the service provider server 180 for direct and/or automatic settlement of purchase requests between each merchant 140 and one or more users via the merchant interface application 142 and the marketplace application 146, in a manner as described herein.

In one embodiment, the merchant interface application 142 comprises a software program, such as a GUI, executable by a processor that is configured to interface and communicate with one or more users and/or the service provider server 180 via the network 110. In another implementation, the merchant interface application 142 comprises a network interface module that makes information available to the user device 120 over the network 110. For example, the merchant interface application 142 may be implemented, in part, as a website manager to provide, list, and present information to the user device 120 via the network 110. In another example, each merchant device 140 is capable of providing one or more network based merchant websites to allow viewing, searching, and selecting of items, products, and/or services for purchase by the user via the user device 120, and the user is able to purchase items, products, and/or services from the one or more merchant devices 140 via the merchant websites and the service provider server 180. Accordingly, each of the merchant devices 140 may conduct financial transactions (e.g., location based mobile commerce for purchasing and proffering payment for items, products, and/or services) with the user via the merchant interface application 142 and the service provider server 180, in a manner as described herein.

Each of the merchant devices 140, in one embodiment, may include a marketplace application 146, which may be configured to provide information related to the products and/or services database 144 to the user interface application 122 of the user device 120 via the network 110. For example, the user may interact with the marketplace application 146 through the user interface application 122 over the network 110 to search and view various items, products, and/or services available for purchase from the products/services database 144. The marketplace application 146 may include a checkout module, which may be configured to facilitate online financial transactions (e.g., geo-location based mobile commerce) by the user of items, products, and/or services identified by each merchant server 140 for purchase. Accordingly, in one aspect, the checkout module of the marketplace application 146 may be configured to accept payment from the user over the network 110 and process the payment via interaction with the service provider server 180, in a manner as described herein.

Each of the merchant devices 140, in various embodiments, may include at least one merchant identifier, which may be included as part of the one or more items, products, and/or services made available for purchase so that, e.g., particular items, products, and/or services are associated with particular merchant devices 140. In one implementation, the merchant identifier may include one or more attributes and/or parameters related to the merchant, such as business and/or banking information. For example, the merchant identifier may be passed from a particular merchant 140 to the service provider server 180 when the user selects an item, product, and/or service for hold, monitor, and/or purchase from the particular merchant 140. The merchant identifier 148 may be used by the service provider server 180 to associate particular items, products, and/or services selected for purchase with a particular merchant account maintained by the service provider server 180. As described in greater detail herein, the user may conduct financial transactions (e.g., selection, monitoring, purchasing, and/or providing payment for items, products, and/or services) with each merchant server 140 via the service provider server 180 over the network 110.

In various embodiments, each of the one or more business entities having a related merchant server 140 may need to establish at least one merchant account with the service provider server 180. When establishing a merchant account, each of the one or more business entities may need to provide business information, such as owner name, owner address, social security number, date of birth, phone number, email address, etc., and financial information, such as banking information, merchant account information, credit card information, payment processing information, etc.

Each of the merchant devices 140, in various embodiments, includes a network interface component (NIC) 148 adapted for communication with the network 110. In various implementations, the network interface component 148 may comprise a wireless communication component, such as a wireless broadband component, a wireless satellite component, or various other types of wireless communication components including radio frequency (RF), microwave frequency (MWF), and/or infrared frequency (IRF) components adapted for communication with the network 110. In other various implementations, the network interface component 148 may be adapted to interface with a DSL (e.g., Digital Subscriber Line) modem, a PSTN (Public Switched Telephone Network) modem, an Ethernet device, and/or various other types of wired and/or wireless network communication devices adapted for communication with the network 110.

The one or more social network contact devices 160, in one embodiment, may be substantially similar to the user device 120 but is used by the user device 120 to facilitate online financial transactions, for example, to expand a geographic area search for local inventory, to expand a geographic area search for optimized search results, and/or to expand/optimize pickup capability of purchased items. In other embodiments, the one or more social network contact devices 160 may have a subset of the elements of the user device 120. The one or more social network contact devices 160 is associated with one or more social network contacts of the user, who is associated with user device 120. A social network contact is used as but one illustration and may refer to various human contacts through various relationships with the user. For example, a social network contact may be in relationship with the user through various networks, such as an online social network, an offline social network, an online professional network, an offline professional network, an organizational network, a family network, and so on.

Each of the social network contact devices 160, in various embodiments, may be implemented using any appropriate combination of hardware and/or software configured for wired and/or wireless communication over the network 110. In one embodiment, the social network contact device 160 may be implemented as a mobile communication device (e.g., wireless cellular phone) adapted for communication with the network 110. In other embodiments, the social network contact device 160 may be implemented as a personal computer (PC), a personal digital assistant (PDA), a notebook computer, and/or various other generally known types of wired and/or wireless computing devices for communication with the network 110. It should be appreciated that the social network contact device 160 may be referred to as a client device or a customer device without departing from the scope of the present disclosure.

Each of the social network contact devices 160, in one embodiment, includes a social network contact interface application 162, which may be utilized by a social network contact to accept or reject search requests, geo-location release requests, pickup requests, incentives, submit search/pickup preferences, submit pickup confirmations, and so forth. In various embodiments, social network contact interface application 162 may also include functionality similar to user interface application 120, including capability to conduct network based financial transactions (e.g., remote network based commerce, such as shopping, purchasing, bidding, etc.) with the one or more merchant devices 140 and/or the service provider server 180 over the network 110. For example, the social network contact device 160 may also be implemented as a location based mobile commerce application to initiate, track, manage, and store information related to remote network based commerce for viewing, searching, and purchasing of items, products, and/or services over the network 110. In one implementation, the social network contact device 160 may be linked to an account with the service provider server 180 for direct and/or automatic settlement of incentives (e.g., money transfers upon notification of a pickup) between the user and the one or more social network contact devices 160 via the user interface application 122, in a manner as described herein.

In one embodiment, the social network contact interface application 162 comprises a software program, such as a graphical user interface (GUI), executable by a processor that is configured to interface and communicate with the user device 120 and/or the service provider server 180 via the network 110. In one aspect, the social network contact interface application 162 comprises a browser module that provides a network interface to browse information available over the network 110. For example, the social network contact interface application 162 may be implemented, in part, as a web browser to view and search information available over the network 110. In another example, the social network contact is able to access merchant websites of the one or more merchant devices 140 over the network 110, e.g., to view, search, and select items, products, and/or services for pickup, to view merchant location directions, and/or to setup an appointment for pickup, for example directly with merchant device 140 or via the service provider server 180.

Each of the social network contact devices 160, in various embodiments, may include other applications 164 as may be desired in one or more embodiments of the present disclosure to provide additional features available to the user. In one example, such other applications 164 may include security applications for implementing social network contact-side security features, programmatic client applications for interfacing with appropriate application programming interfaces (APIs) over the network 110, and/or various other types of generally known programs and/or software applications. In still other examples, the other applications 164 may interface with the social network contact interface application 162 for improved efficiency and convenience. In one example, files, data, and/or information may be imported from various types of accounting software (e.g., a spreadsheet application) directly into the social network contact interface application 162 for improved tracking of settlements related to incentives/pickups via the network 110.

Each of the social network contact devices 160, in one embodiment, includes a geo-location component 166 adapted to monitor and provide an instant geographical location (i.e., geo-location) of the social network contact device 160. In one implementation, the geo-location of the social network contact device 160 may include global positioning system (GPS) coordinates, zip-code information, area-code information, street address information, and/or various other generally known types of geo-location information. In one example, the geo-location information may be directly entered into the social network contact device 160 by the social network contact via a user input component, such as a keyboard, touch display, and/or voice recognition microphone. In another example, the geo-location information may be automatically obtained and/or provided by the social network contact device 160 via an internal or external GPS monitoring component. In one aspect, when interfacing with the social network contact device 160, the social network contact may elect to provide or may be prompted to provide permission for the release of geo-location information. Accordingly, the social network contact may have exclusive authority to allow transmission of geo-location information from the social network contact device 160 to the user device 120 and/or the service provider server 180. In any instance, the user device 120 and/or the service provider server 180 may communicate with the social network contact device 160 via the network 110 and request permission to acquire geo-location information from the social network contact device 160 for geo-location based mobile commerce. These and other aspects of the present disclosure are described in greater detail herein. The social network contact device 160 may thus opt in/out or accept/reject search requests from a user device 120 or service provider server 180.

Each of the social network contact devices 160, in one embodiment, includes a network interface component (NIC) 168 adapted for communication with the network 110. In various implementations, the network interface component 168 may comprise a wireless communication component, such as a wireless broadband component, a wireless satellite component, or various other types of wireless communication components including radio frequency (RF), microwave frequency (MWF), and/or infrared frequency (IRF) components adapted for communication with the network 110. In other various implementations, the network interface component 168 may be adapted to interface with a DSL (e.g., Digital Subscriber Line) modem, a PSTN (Public Switched Telephone Network) modem, an Ethernet device, and/or various other types of wired and/or wireless network communication devices adapted for communication with the network 110.

Each of the social network contact devices 160, in one embodiment, may include a social network contact identifier, which may be implemented, for example, as operating system registry entries, cookies associated with the social network contact interface application 162, identifiers associated with hardware of the social network contact device 160, and/or various other appropriate identifiers. The social network contact identifier may include one or more attributes related to the social network contact, such as personal information related to the social network contact (e.g., one or more social network contact names, passwords, photograph images, biometric ids, addresses, phone numbers, etc.) and banking information (e.g., one or more banking institutions, credit card issuers, social network contact account numbers, security data and information, etc.). In various aspects, the social network contact identifier may be passed with a social network contact login, search or pickup preferences, pickup notification, or incentive request to the service provider server 180 via the network 110. The social network contact identifier may also be used by the service provider server 180 to associate the social network contact with a particular social network contact account maintained by the service provider server 180, in a manner as described herein.

The service provider server 180, in one embodiment, may be maintained by an online transaction processing entity, which may provide processing for online financial transactions and/or information transactions between the user device 120, one or more of the merchant devices 140, and/or one or more of the social network contact devices 160. As such, the service provider server 180 includes a service interface application 182, which may be adapted to interact with the user device 120, each merchant device 140, and/or each social network contact device 160 over the network 110 to facilitate the selection, purchase, and/or payment of items, products, and/or services by the user device 120 from one or more of the merchant devices 140. In some instances, the search and selection of items by a user of the user device 120 is facilitated by one or more of the social network contact devices 160. In one example, the service provider server 180 may be provided by PayPal, Inc. and/or eBay, Inc. of San Jose, Calif., USA.

The service interface application 182, in one embodiment, utilizes a payment processing module to process purchases and/or payments for financial transactions between the user device 120 and each of the merchant devices 140. In one implementation, the payment processing module assists with resolving financial transactions through validation, delivery, and settlement. Accordingly, the service interface application 182 in conjunction with the payment processing module is adapted to settle indebtedness between the user device 120 and each of the merchant devices 140, wherein accounts may be directly and/or automatically debited and/or credited of monetary funds in a manner as accepted by the banking industry.

The service interface application 182, in one embodiment, also utilizes a payment processing module to process incentives (e.g., money payments for purchased item pickup) between the user device 120 and each of the social network contact devices 160. In one implementation, the payment processing module assists with resolving financial transactions through validation, delivery, and settlement. Accordingly, the service interface application 182 in conjunction with the payment processing module is adapted to settle indebtedness between the user device 120 and each of the social network contact devices 160, wherein accounts may be directly and/or automatically debited and/or credited of monetary funds in a manner as accepted by the banking industry.

The service application 182, in one embodiment, may utilize a selection processing module to process and monitor user selection events during online shopping by the user via the user device 120. In one aspect, the selection processing module allows the service provider server 180 to process and monitor user selections during online navigation and shopping events over the network 110. For example, the service provider server 180 interfaces with the user device 120 via, e.g., a browser window to monitor the user and the user device 120 during navigation and shopping events on various merchant sites. The selection processing module may be used by the service provider server 180 to monitor user selections of one or more items, products, and/or services.

The service provider server 180, in one embodiment, may be configured to maintain one or more user accounts, merchant accounts, and social network contact accounts in an account database 184, each of which may include account information 186 associated with one or more individual users and user devices 120, the one or more merchants and merchant devices 140, and the one or more social network contacts and social network contact devices 160. For example, account information 186 may include private financial information of the user, each merchant, and each social network contact, such as one or more account numbers, passwords, credit card information, banking information, or other types of financial information, which may be used to facilitate online financial transactions between the user, the one or more merchant devices 140, and the one or more social network contact devices 160. In various implementations, the methods and systems described herein may be modified to accommodate additional users, social network contacts, and/or additional merchants that may or may not be associated with at least one existing user account, social network contact account, and/or merchant account, respectively.

In one implementation, the user and/or the user device 120 may have identity attributes stored with the service provider server 180, and the user and/or user device 120 may have credentials to authenticate or verify identity with the service provider server 180. In one aspect, user attributes may include personal information and banking information, as previously described. In various other aspects, the user attributes may be passed to the service provider server 180 as part of a login, selection, purchase, and/or payment request, and the user attributes may be utilized by the service provider server 180 to associate the user and/or the user device 120 with one or more particular user accounts maintained by the service provider server 180.

Similarly, in another implementation, each of the merchant devices 140 may have identity attributes stored with the service provider server 180, and each of the merchant devices 140 may have credentials to authenticate or verify identity with the service provider server 180. In one aspect, merchant attributes may include business information and banking information, as previously described. In various other aspects, the merchant attributes may be passed to the service provider server 180 as part of a login and/or transaction request, and the merchant attributes may be utilized by the service provider server 180 to associate each of the merchant devices 140 with one or more particular merchant accounts maintained by the service provider server 180.

Similarly, in another implementation, each of the social network contact devices 160 may have identity attributes stored with the service provider server 180, and each of the social network contact devices 160 may have credentials to authenticate or verify identity with the service provider server 180. In one aspect, social network contact attributes may include personal info nation and banking information, as previously described. In various other aspects, the social network contact attributes may be passed to the service provider server 180 as part of a login, selection, pickup notification, and/or payment request, and the social network contact attributes may be utilized by the service provider server 180 to associate the social network contact and/or the social network contact device 160 with one or more particular user accounts maintained by the service provider server 180.

The service provider server 180, in various embodiments, may include at least one network interface component (NIC) 188 adapted for communication with the network 110 and any network based communication devices including the network interface component 128 of the user device 120, the network interface component 148 of each merchant 140, and the network interface component 168 of each social network contact device 160. In various implementations, the network interface component 188 of the service provider server 180 may include a wireless communication component, such as a wireless broadband component, a wireless satellite component, or various other types of wireless communication components including radio frequency (RF), microwave frequency (MWF), and/or infrared frequency (IRF) components adapted for communication with the network 110. In other various implementations, the network interface component 148 may be adapted to interface with a DSL (e.g., Digital Subscriber Line) modem, a PSTN (Public Switched Telephone Network) modem, an Ethernet device, and/or various other types of wired and/or wireless network communication devices adapted for communication with the network 110.

The service provider server 180, in various embodiments, may include one or more databases 190 (e.g., internal and/or external databases) for storing and tracking information related to financial transactions between particular users, such as the user, the one or more merchant devices 140, the one or more social network contact devices 160, and the service provider server 180. For example, the databases 190 may provide a historical survey of financial transactions (e.g., remote network based financial transactions, such as geo-location based mobile commerce) between the user device 120, the one or more merchant devices 140, the one or more social network contact devices 160, and the service provider server 180. As such, in one implementation, the service interface application 182 may be adapted to track, log, store financial transaction information related to network based commerce between the user device 120, each merchant device 140, and each social network contact device 160, and then access this financial information from the databases 190 for analysis, maintenance, and settlement.

The one or more databases 190 (e.g., internal and/or external databases) may also be utilized for storing and tracking information related to search and pickup transactions between the user associated with user device 120 and the one or more social network contacts associated with the one or more social network contact devices 160. For example, the databases 190 may provide a historical survey or data of accepted or opt-in searches from the user device 120 (or service provider server 180) by the one or more social network contact devices 160, and/or data of accepted pickup requests from the user device 120 (or service provider server 180) by the one or more social network contact devices 160. As such, in one implementation, the service interface application 182 may be adapted to track, log, store accepted searches or pickup requests as well as financial transaction information (e.g., monetary incentives) between the user device 120 and each social network contact device 160, and then access this financial information from the databases 190 for analysis, maintenance, settlement, and/or future search/pickup requests.

Figure 2:
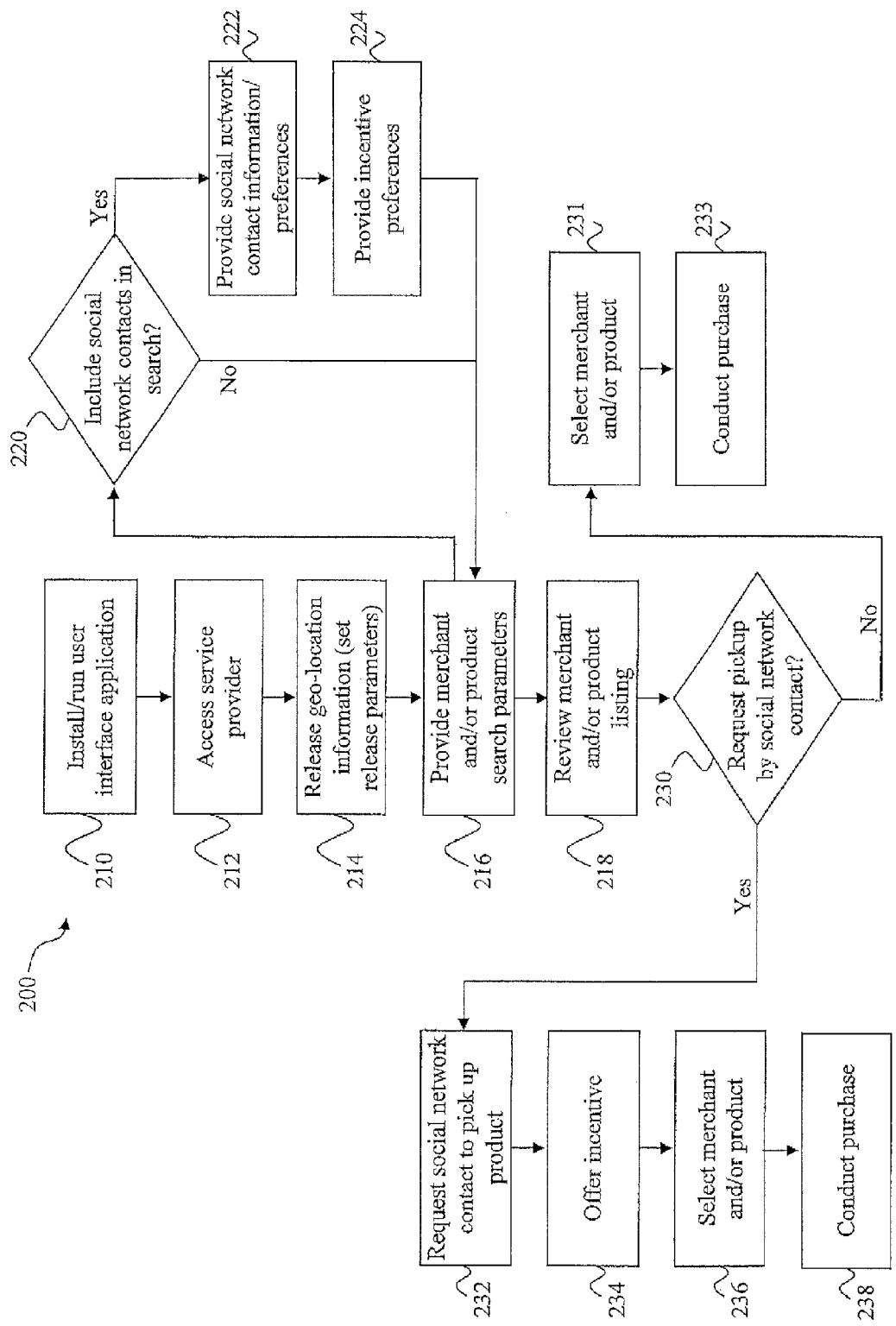
FIG. 2 shows one embodiment of a method for facilitating user-side location based mobile commerce over a network, in accordance with an embodiment of the present disclosure.

FIG. 2 shows one embodiment of a method for facilitating a user-side financial transaction (e.g., a user transaction process) including leveraging a social network to search for local inventory and location based mobile commerce over the network 110, such as the Internet via, e.g., mobile communication networks. Referring to FIGS. 1 and 2, the method 200 facilitates a user-side transaction process over the network 110 in reference to the user device 120 and the user interface application 122. In one implementation, the user interface application 122 allows the user device 120 to communicate with the service provider server 180 and/or the one or more social network contact devices 160 via the network 110 to conduct remote commerce, such as searching, selecting, and monitoring one or more items, products, and/or services for purchase consideration provided by the one or more of the merchant devices 140 and to communicate with the service provider server 180 to process online financial transactions (e.g., purchase requests) for items, products, and/or services selected for purchase.

In one implementation, upon user instruction, the user interface application 122 may be installed and/or run on the user device 120 (block 210). A user may run the user interface application 122 on the user device 120 to access the service provider server 180 (block 212) via the network 110. In one aspect, upon installation and/or execution of the user interface application 122, the user may be prompted to establish a user account for login with the service provider server 180, wherein the user may use the user interface application 122 and the user device 120 to access the service provider server 180 via the network 110. When establishing a user account, the user may be asked to provide personal information, such as name, address, phone number, etc., and financial information, such as banking information, credit card information, etc. In another aspect, referring to FIG. 1, information related to the user may be packaged as a user identifier.

Next, the user releases geo-location information to the service provider server 180 by, e.g., setting release parameters (block 214). In one aspect, the user geo-location information includes user information related to a physical location or position of the user device 120 embedded as arguments in an expression, which are passed to the service provider server 180 via the network 110. The user geo-location information may include GPS coordinates (e.g., longitude and latitude) inherent to the user device 120, such as a mobile cellular phone, and/or zip-code information. The user geo-location information may include user identifier information having dynamic arguments identifying the user. The user may manually set geo-location information, such as a zip code and/or longitude and latitude coordinates.

In another aspect, release parameters may be manually set by the user. For example, the user may allow automatic distribution of geo-location information for any query by the one or more merchants 140 associated with the service provider server 180, or the user may only allow release of geo-location information for some trusted merchants. For example, the user may elect to grant permission to preferred merchants and exclude other merchants that the user deems undesirable.

In one embodiment, location based mobile commerce may be optimized based on the user's geo-location and preferences. For example, the geo-location of the user may be based on zip-code information and/or location information (e.g., GPS coordinates), which may be established by the service provider 180 by utilizing GPS information inherent in the user device 120 (e.g., mobile communication device) or a user's manual input of GPS and/or zip-code information to the user device 120. Accordingly, a user may search for items, products, and services based on geo-location information related to either the user, the social network contacts, or the merchants, and the user's search results for intended items, products, and services to be purchased may be displayed as a merchant listing to the user via the user device 120. In one example, the user may scan a barcode of an item to search for the item in a current locality.

Next, the user provides merchant and/or product search parameters (block 216). In one implementation, the user may provide merchant and/or product search parameters to search and view items, products, and/or services for purchase consideration. In another implementation, comparison shopping may be facilitated by overlaying search results with different merchants and network based shopping platforms. Users may interface with mapping and GPS capability inherent to the user device 120 to monitor and track items, products, and services offered by particular merchants. As such, users have the capability to view items, products, and services for comparison shopping.

The user also provides a decision as to whether or not to include social network contacts and their associated device locations in the merchant and/or product search parameters (decision block 220). If not, then the search may be conducted with mapping and GPS capability inherent only to the user device 120. If yes, then the user may provide social network contact information and preferences (block 222) and incentive preferences (block 224). Social network contact info/illation (e.g., name, address, mobile phone number, etc.) may be provided by the user manually via user device 120, automatically from a contacts list in user device 120, or manually/automatically from a social network server, which may be separate from or within service provider server 180. Social network contact preferences are user preferences specified for a social network contact and may include for example, selecting certain contacts to be included in the search, certain contacts to be excluded in the search, automatic inclusion of all contacts, inclusion of contacts only if the search local to the user device 120 is unsuccessful (e.g., falls below a threshold of listings), categorization of contacts, and so on. Incentive preferences may include for example, incentive messages, incentive types, incentive amounts, timing of incentive offers, incentive associated with a specified contact, and so on.

Next, the user reviews merchant and/or product listings (block 218). In one aspect, the merchant and/or product listings is displayed as one or more searchable lists on a display component of the user device 120, such as a viewable text image on a display of a mobile communication device. In one aspect, the merchant and/or product listings may be grouped as local to the user or local to one or more social network contacts.

Next, the user may make a decision as to whether or not to request a pickup of a product by a social network contact (decision block 230). The user may decide to purchase online and wait, pick up the product him/herself (e.g., if the product is local to the user), or request a pickup by a social network contact.

If the user decides to request a pickup by a social network contact ("Yes"), the user may send a request for pickup by the social network contact (block 232). The user may send a request via user device 120 to social network contact device 160 by way of email, text message, or an automated pickup request from server 180. The request may also be made through the service provider, the merchant, the social network, or another third party. An incentive may or may not be offered to the social network contact (block 234). If the social network contact agrees to the pickup request, the user may select a merchant and/or product (block 236) and conducts a purchase transaction (block 238). In one implementation, the user interfaces with the service provider server 180 to provide a purchase request for one or more items, products, and/or services selected from the merchant and/or product listing. The service provider server 180 is adapted to process the purchase transaction on behalf of the user and the merchant. If the social network contact does not agree to the pickup request, the user may select another social network contact local to the desired purchase item and request a pickup by the second social network contact. The user may continue pickup requests from social network contacts until successful. Pickup requests, selection of social contacts, and incentive offers may be filtered against social network contact preferences and incentive preferences provided by the user (blocks 222, 224).

If the user decides not to request a pickup by a social network contact ("No"), the user may select a merchant and/or product (block 231) and conduct a purchase transaction (block 233). In one implementation, the user interfaces with the service provider server 180 to provide a purchase request for one or more items, products, and/or services selected from the merchant and/or product listing. The service provider server 180 is adapted to process the purchase transaction on behalf of the user and the merchant.

Figure 3:
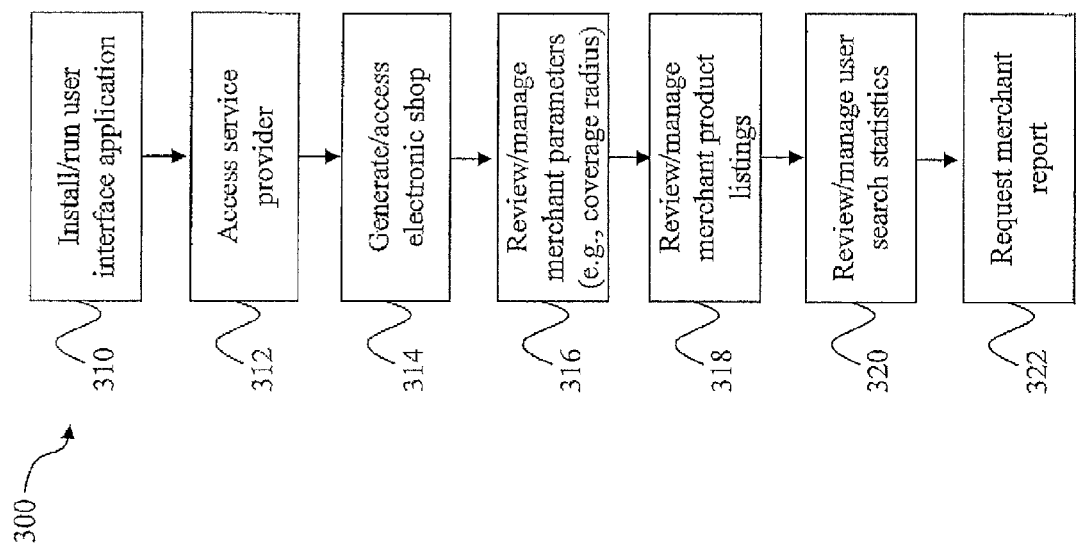
FIG. 3 shows one embodiment of a method for facilitating merchant-side location based mobile commerce over a network, in accordance with an embodiment of the present disclosure.

FIG. 3 shows one embodiment of a method 300 for facilitating a merchant-side financial transaction (e.g., a merchant transaction process) including location based mobile commerce over the network 110, such as the Internet via, e.g., mobile communication networks. Referring to FIGS. 1 and 3, the method 300 facilitates a merchant-side transaction process over the network 110 in reference to the merchant devices 140 and the merchant interface application 142. In one implementation, the merchant interface application 142 allows the merchant devices 140 to communicate with the service provider server 180 via the network 110 to conduct remote commerce, such as listing and proffering items, products, and/or services for sale or purchase consideration and to communicate with the service provider server 180 to process online financial transactions (e.g., purchase requests) for proffered items, products, and/or services listed for purchase.

In one implementation, upon merchant instruction, the merchant interface application 142 may be installed and/or run on the merchant devices 140 (block 310). A merchant may run the merchant interface application 142 on the merchant device 140 to access the service provider server 180 (block 312) via the network 110. In one aspect, upon installation and/or execution of the merchant interface application 142, the merchant may be prompted to establish a merchant account for login with the service provider server 180, wherein the merchant may use the merchant interface application 142 and the merchant device 140 to access the service provider server 180 via the network 110. When establishing a merchant account, the merchant may be asked to provide business information, such as business name, address, phone number, etc., and financial information, such as banking information, credit card information, etc. In another aspect, referring to FIG. 1, information related to the merchant may be packaged as a merchant identifier.

Next, the merchant generates and/or accesses an electronic shop or listing related to the merchant (block 314). In one implementation, the electronic shop refers to a listing of items, products, and/or services proffered for sale or purchase consideration provided by the merchant to the service provider server 180. One or more items, products, and/or services listed by the merchant may be sent to the user device 140 by the service provider server 180 when the user conducts a merchant and/or products search. This listing of items, products, and/or services may be sent to the user device 120 via the network 110 when the user is in a particular radius of coverage (e.g., preferred region) indicated by the merchant.

In one embodiment, the system 100 of FIG. 1 and method 300 of FIG. 3 provides merchants the capability to list items, products, and services that may be searched and purchased through a user based mobile communication device. In one implementation, merchants have the capability to create an electronic shop via the network 110 via a mobile communication device (e.g., a cell phone). The electronic shop may be integrated with purchase and payment options via the service provider 180 for a user to purchase directly from the user's mobile communication device 120.

Next, the merchant may review and/or manage merchant parameters from the merchant device 140 (block 316). In one aspect, the merchant parameters may include a designation of a radius of coverage (e.g., preferred region of coverage, such as a specified zip-code or a physical region) for the merchant. For example, if the merchant is located in a particular zip-code, then the merchant prefers to list items, products, and/or services provided by the merchant to the user device 120 when the user searches for items, products, and/or services related to the merchant. As such, the merchant is able to target particular user devices (e.g., user device 120) that is searching for items, products, and/or services that the merchant offers for sale or purchase consideration. Likewise, the merchant may target other client devices (e.g., user device 120 and social network contact devices 160) as their geo-locations are included in the search for merchant items, products, and/or services.

In one embodiment, radius of coverage may be related to geo-location information, such as GPS coordinates (e.g., longitude and latitude) inherent to the physical location of the merchant, the user, and/or the social network contact. The merchant geo-location information may include merchant identifier information having dynamic arguments identifying the GPS position of the merchant and, in some instances, the GPS position of the items, products, and/or services as indicated by the merchant. The merchant may manually set geo-location information, such as a zip code and/or longitude and latitude coordinates, or the service provider server 180 may provide these coordinates based on an address provided by the merchant.

In one embodiment, location based mobile commerce may be optimized based on the user's and social network contacts' geo-location and preferences. In one aspect, merchants may target geo-locations that may be based on zip-code information and/or location information (e.g., longitude and latitude via GPS coordinates), which may be established by the service provider 180.

Other merchant parameters may include when and how often the list of items, products, and/or services may be sent to user devices 120. For example, the merchant may allow automatic distribution of listings for any query by one or more users associated with the service provider server 180, or the merchant may only allow distribution of listings for particular users. For example, the merchant may only allow distribution listings to be sent to users that may be interested in their items, products, and/or services.

Next, the merchant may review and/or manage merchant product listings from the merchant device 140 (block 318). In one aspect, the merchant may provide descriptions of items, products, and/or services for sale or purchase consideration. In another aspect, the merchant may manage item listing (e.g., supply chain management, inventory control, etc) via a mobile communication device.

Next, the merchant may review and/or manage user search statistics from the merchant device 140 (block 320). In one embodiment, merchants may interface with mapping and GPS capability inherent to mobile communication devices to monitor and track querying users via the network 110. As such, merchants have the capability to view potential buyers of their items, products, and services. In one aspect, merchants have the capability to generate a detailed report on searches for there items, products, and services with information related to querying statistics from different locations. For example, merchants may view which items are searched the most from which locations, and merchants may generate a report on whether increasing a radius of coverage could improve sales. In another embodiment, merchants may receive notification that an item, product, and/or service has been purchased (e.g., through a text, an email, and/or a resident client application).

Next, the merchant may request a merchant report from the merchant device 140 (block 322). The merchant report may outline current and/or past merchant parameters including radius of coverage, product listings, and user search statistics. The merchant report may include any changes made to merchant parameters including radius of coverage and product listings.

Figure 4A:
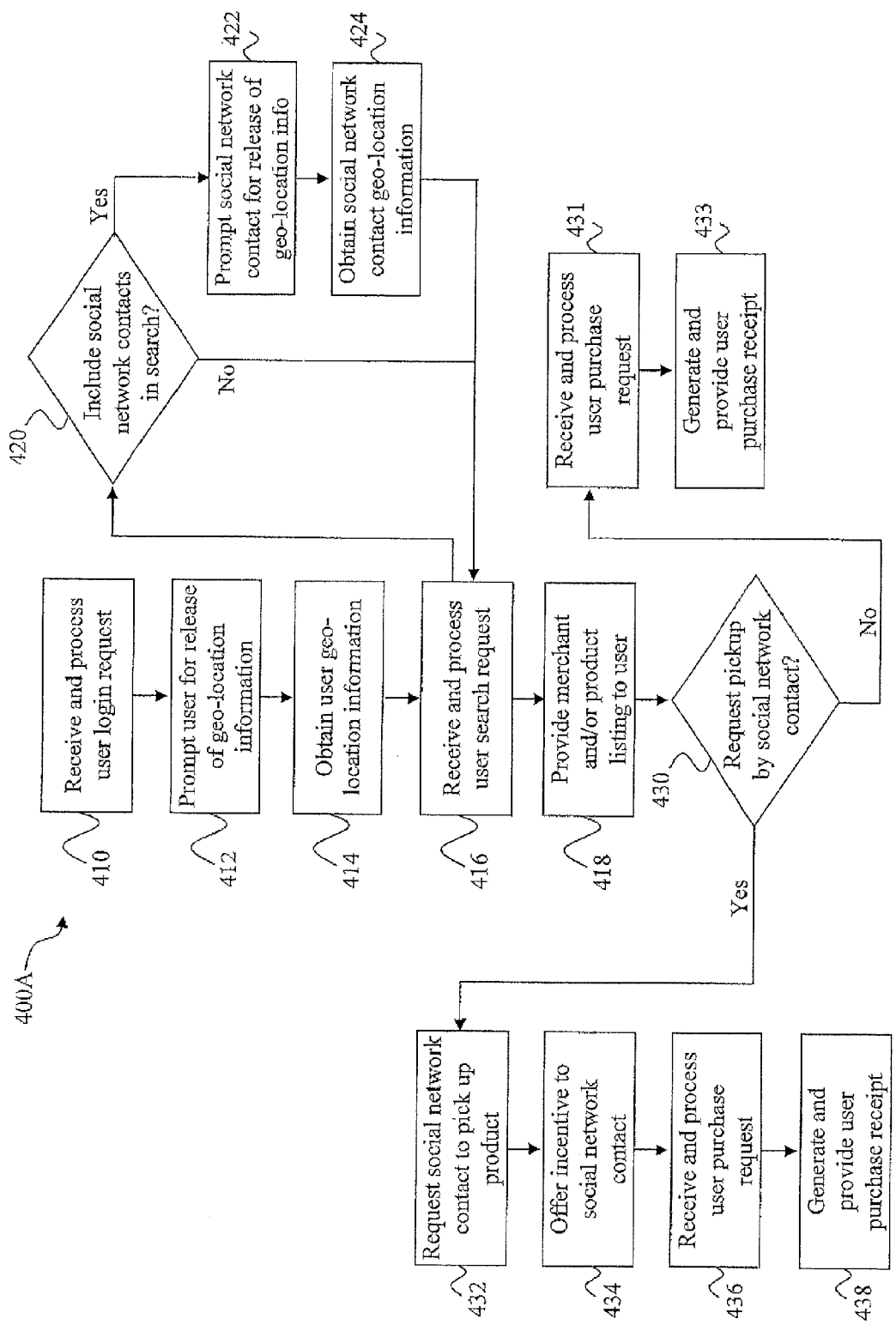
FIGS. 4A and 4B show embodiments of methods for facilitating server-side location based mobile commerce over a network, in accordance with an embodiment of the present disclosure.

FIG. 4A shows one embodiment of a method 400A for facilitating financial transactions (e.g., a service provider transaction process on behalf of the user) including location based mobile commerce over the network 110, such as the Internet via, e.g., mobile communication networks. Referring to FIGS. 1 and 4A, the method 400A facilitates a server-side transaction process over the network 110 in reference to the user device 120 via the user interface application 122. In one implementation, the service interface application 182 allows the service provider server 180 to communicate with the user device 120, the merchant device 140, and the social network contact device 160 via the network 110 to process gee location based commerce and services on behalf of the user and the merchant (e.g., such as searching, selecting, and monitoring one or more items, products, and/or services for purchase consideration).

In one implementation, the service provider server 180 receives a login request from the user via the user device 120 (block 410), and then the service provider server 180 processes the user login request (block 410). In one aspect, upon receiving the user login request, the service provider server 180 may determine whether the user is an existing user having an established user account 184 by, e.g., checking a user account list in a user account database. If the user does not have an established user account, then the service provider server 180 prompts the user to establish a user account 184 by providing user information 186, and the service provider server 180 uploads the user interface application 122 to the user device 120 so that the user may install and run the user interface application 122 on user device 120. Once the user interface application 122 is installed and run on the user device 120, the service provider server 180 prompts the user for release of current geo-location information (block 412). Otherwise, if the user is determined to be an existing user by the service provider server 180, then the service provider server 180 verifies the user account and user identification information provider by user in the user login request. The service provider server 180 may determine if the user account is current and active. In some instances, user account information may need to be updated, and thus, the service provider server 180 may prompt the user to update user account information 186 in the user account 184 for the user. However, if the user account 184 is current and active, then the service provider server 180 prompts the user for release of current geo-location information (block 412). It should be appreciated by those skilled in the art that the service provider server 180 may cancel the user login request at any time during the process of method 400A if, e.g., it is determined by the service provider server 180 that the user enters wrong information or the user is trying to purchase an item with criminal intent. Similar login, account creation, and account verification procedures as described above with a user and user device 120 are applicable to a social network contact and social network contact device 160.

Next, if the user releases current geo-location information, the service provider server 180 is adapted to obtain the user's geo-location information from the user device 120 (block 414) via communication between the service interface application 182 and the user interface application 122 of the user device 120. Accordingly, the service provider server 180 may use the geo-location information of the user to process user search requests for merchants and items, products, and services of these merchants.

Next, the service provider server 180 is adapted to receive and process user search requests from the user device 120 (block 416). In one implementation, the service provider server 180 is adapted to track user selections by monitoring user events as provided by the user and the user device 120 via the user interface application 122. The user selections may be constantly updated, when, e.g., the user makes changes (e.g., additions, deletions, movements, etc.) to user selections via the user interface application 122. In another aspect, the service provider server 180 is adapted to display updated user selections to the user via the user interface application 122. The service provider server 180 may store, either temporarily or permanently, the user selections and/or any changes to the user selections for reference and other additional processing.

The service provider server 180 is also adapted to receive and process a user decision as to whether or not to include social network contacts and their associated social network contact device locations in the merchant and/or product search parameters (decision block 420). If the user decides to not include social network contacts in the search ("No"), then the search may be conducted with mapping and GPS capability inherent only to the user device 120. If the user decides to include social network contacts in the search ("Yes"), then the service provider server 180 may receive and process social network contact information and preferences (block 222) and incentive preferences (block 224) provided by the user as further described above. Service provider server 180 may then prompt selected social network contacts for release of geo-location information (block 422) and obtain social network contact geo-location information if allowed (block 424).

Similar account login, account creation, and account verification procedures as described above with a user and user device 120 are applicable to a social network contact and social network contact device 160, although an account is not required to be created with server 180 for the one or more social network contact devices 160. After a social network contact account is created or with the installation of a social network contact interface application (e.g., without account creation), the service provider server 180 may prompt the social network contact device 160 for release of current geo-location information (block 422). Otherwise, if the social network contact is determined to be an existing user by the service provider server 180, then the service provider server 180 verifies the social network contact account and contact identification information provided by the network contact device 160. The service provider server 180 may determine if the contact account is current and active. In some instances, contact account information may need to be updated, and thus, the service provider server 180 may prompt the contact to update account information. However, if the social network contact account is current and active, then the service provider server 180 prompts the user for release of current geo-location information (block 422).

Next, if the social network contact releases current geo-location information, the service provider server 180 is adapted to obtain the social network contact's geo-location information from the social network contact device 160 (block 424) via communication between the service interface application 182 and the social network contact interface application 162 of the user device 160. Accordingly, the service provider server 180 may use the geo-location information of the one or more social network contacts to process user search requests for merchants and items, products, and services of these merchants.

Next, based on user selection information received from the user device 120, the service provider server 180 is adapted to provide merchant and/or product listings to the user 120 (block 418). In one aspect, server 180 may provide the merchant and/or product listings as one or more searchable lists on a display component of the user device 120, such as a viewable text image on a display of a mobile communication device. In one aspect, the merchant and/or product listings may be grouped as local to the user or local to one or more social network contacts.

Next, server 180 is configured to receive and process a user decision from user device 120 as to whether or not to request a pickup of a product by a social network contact (decision block 430). The user may decide to purchase online and wait, pick up the product him/herself (e.g., if the product is local to the user), or request a pickup by a social network contact.

If the user decides to request a pickup by a social network contact ("Yes"), the server 180 may send a request to pickup by the social network contact (block 432). The pickup request may be sent by email, text message, or any of various communication means and methods from server 180. An incentive may or may not be offered to the social network contact (block 434). If the social network contact agrees to the pickup request, the user may select a merchant and/or product and server 180 receives and processes the user purchase request (block 436) and conducts a purchase transaction and generates and provides a user purchase receipt (block 438). The service provider server 180 is adapted to process the purchase transaction on behalf of the user and the merchant. Pickup requests, selection of social contacts, and incentive offers may be filtered against social network contact preferences and incentive preferences provided by the user.

If the user decides not to request a pickup by a social network contact ("No"), the user may select a merchant and/or product, the server 180 receives and processes the user purchase request (block 431) and conducts a purchase transaction, generating and providing a user purchase receipt (block 433). The service provider server 180 is adapted to process the purchase transaction on behalf of the user and the merchant In one embodiment, the service provider server 180 tracks and monitors user search and purchase requests from the merchant and/or product listings. For example, the service provider server 180 links the generated merchant and/or product listings, and item selection information related thereto, to a user account in the account database 192 related to the user. This allows the service provider server 180 to monitor and update the user's merchant and/or product listings for the user, as instructed and/or requested by the user. In one aspect, this tracking and monitoring information may be provided to the merchants for review.

In another embodiment, the service provider server 180 may process purchase request and any related purchase information provided by the user. The purchase request and/or the purchase information may include information related to the items selected for purchase consideration in the merchant and/or products listings, information related to the merchant providing the selected items for purchase consideration, information related to the user including user account number, balance information, credit card information, etc. The service provider server 180 may access the merchant device 140 to verify purchase information including verifying that the selected item is available (e.g., in stock), verifying pricing information, verifying that the merchant account is up-to-date, etc.

In another embodiment, the service provider server 180 may prompt the user via the user interface application 122 to verify a purchase request. For example, the service provider server 180 may ask the user to complete the purchase transaction by selecting a designated box to complete the purchase transaction. In this way, the service provider server 180 is adapted to allow the user to request processing and/or cancellation of any online financial transactions prior to completion. Based on user request, the service provider server 180 may complete any online financial transactions by deducting the amount of the purchase request from the user account and crediting the amount of the purchase request to a related merchant account. In one aspect, completing a purchase request may include confirming a purchase of the selected products to provide, e.g., a receipt to the user. The user interface application 122 may include a payment mechanism that allows the user to take different actions, such as making purchase requests and providing buttons to complete the purchase at a later time.

Figure 4B:
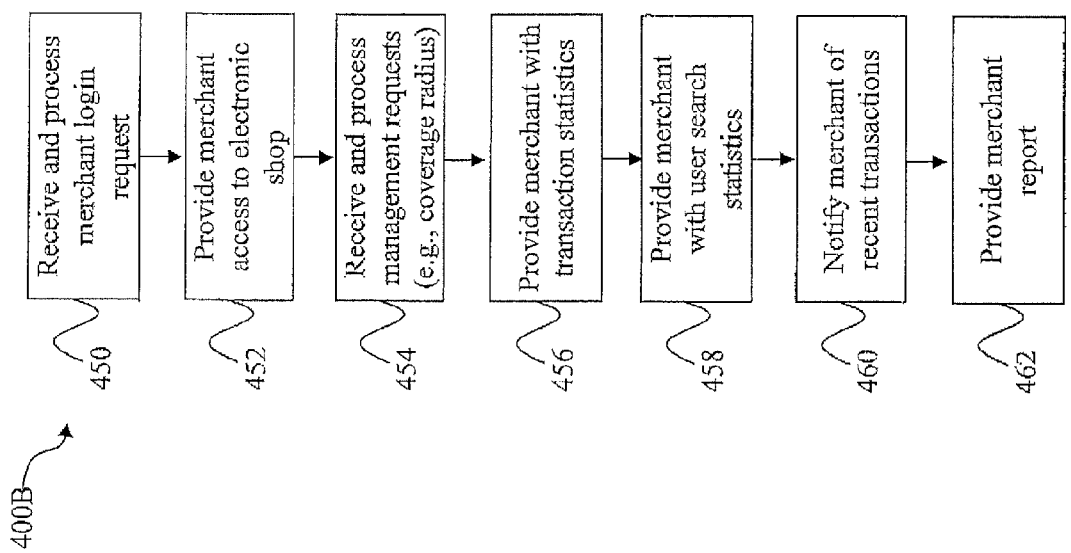

FIG. 4B shows one embodiment of a method 400B for facilitating financial transactions (e.g., a service provider transaction process on behalf of the merchant) including location based mobile commerce over the network 110, such as the Internet via, e.g., mobile communication networks. Referring to FIGS. 1 and 4B, the method 400B facilitates a server-side transaction process over the network 110 in reference to the merchant devices 140 via the merchant interface application 142. In one implementation, the service interface application 182 allows the service provider server 180 to communicate with the merchant devices 140 to process geo-location based commerce and services and process online financial transactions (e.g., purchase requests) for items, products, and/or services selected for purchase between the user and the merchant.

In one implementation, the service provider server 180 receives a login request from the merchant via the merchant device 140 (block 450), and then the service provider server 180 processes the merchant login request (block 450). In one aspect, upon receiving the merchant login request, the service provider server 180 may determine whether the merchant is an existing merchant having an established merchant account 184 by, e.g., checking a merchant account list in a merchant account database. If the merchant does not have an established merchant account, then the service provider server 180 prompts the merchant to establish a merchant account 184 by providing merchant information 186, and the service provider server 180 uploads the merchant interface application 142 to the merchant device 140 so that the merchant may install and run the merchant interface application 142 on the merchant device 140. Once merchant user interface application 142 is installed and run on the merchant device 140, the service provider server 180 provides the merchant access to an electronic shop (block 452). Otherwise, if the merchant is determined to be an existing merchant by the service provider server 180, then the service provider server 180 verifies the merchant account and merchant identification information provider by merchant in the merchant login request. The service provider server 180 may determine if the merchant account is current and active. In some instances, merchant account information may need to be updated, and thus, the service provider server 180 may prompt the merchant to update merchant account information 186 in the merchant account 184 for the merchant. However, if the merchant account 184 is current and active, then the service provider server 180 the service provider server 180 provides the merchant access to an electronic shop (block 452) related to the merchant. It should be appreciated by those skilled in the art that the service provider server 180 may cancel the merchant login request at any time during the process of method 400B if, e.g., it is determined that the merchant enters wrong information or the merchant is trying to unlawfully access an electronic shop.

Next, the service provider server 180 provides the merchant with access to an electronic shop or generates an electronic shop related to the merchant (block 452). In one implementation, the electronic shop refers to a listing of items, products, and/or services proffered for sale or purchase consideration provided by the merchant to the service provider server 180. One or more items, products, and/or services listed by the merchant may be sent to the user device 140 on behalf of the merchant by the service provider server 180 when the user conducts a merchant and/or products search. This listing of items, products, and/or services may be sent to the user device 120 via the network 110 when the user is in a particular radius of coverage (e.g., preferred region) indicated by the merchant.

In one embodiment, the service provider server 180 allows merchants to list items, products, and services that may be searched and purchased by the user via the user device 120, such as a mobile communication device. In one implementation, merchants have the capability to create an electronic shop over the network 110 via a mobile communication device (e.g., a cell phone). The electronic shop may be integrated with purchase and payment options via the service provider 180 for a user to purchase directly from the user's mobile communication device 120.

Next, the service provider server 180 is adapted to receive and process management requests from the merchant (block 454) including obtaining a radius of coverage from the merchant as provided or selected by the merchant. In one aspect, the radius of coverage comprises information related to an area of one or more zip-codes and/or an area of one or more GPS coordinates including longitude and latitude coordinates.

In one implementation, the merchant may review and/or change merchant parameters from the merchant device 140. For example, merchant parameters may include a designation of the radius of coverage (e.g., preferred region of coverage, such as a specified zip-code or a physical region identified by GPS coordinates including longitude and latitude information) identified by the merchant. For example, if the merchant is located in a particular zip-code, then the merchant prefers to list items, products, and/or services provided by the merchant to the user device 120 when the user searches for items, products, and/or services related to the merchant. As such, the merchant is able to target particular user devices (e.g., user device 120) that is searching for items, products, and/or services that the merchant offers for sale or purchase consideration. The merchant may optimize location based mobile commerce based on the user's geo-location and preferences. For example, merchants may target geo-locations within a specified radius of coverage that may be based on zip-code information and/or location information (e.g., longitude and latitude via GPS coordinates), which may be established by either the merchant 140 and/or the service provider 180.

Other merchant parameters may include when and how often the list of items, products, and/or services may be sent to user devices 120. For example, the merchant may allow automatic distribution of listings for any query by one or more users associated with the service provider server 180, or the merchant may only allow distribution of listings for particular users. For example, the merchant may only allow distribution listings to be sent to users that may be interested in their items, products, and/or services.

Next, the service provider server 180 is adapted to provide the merchant with transaction statistics (block 456), provide the merchant with user search statistics (block 458), and notify the merchant of recent transactions (block 460). In one embodiment, merchants may interface with mapping and GPS capability inherent to mobile devices to monitor and track querying users via the network 110. As such, merchants have the capability to view potential buyers of their items, products, and services. In one aspect, merchants have the capability to generate a report on searches for there items, products, and services with information related to querying statistics from different locations. For example, merchants may view which items are searched the most from which locations, and merchants may generate a report on whether increasing a radius of coverage could improve sales. In another embodiment, merchants may receive notification that an item, product, and/or service has been purchased (e.g., through a text, an email, and/or a resident client application).

Next, the service provider server 180 is adapted to provide the merchant with a detailed report (block 462). In one embodiment, the merchant report may outline current and/or past merchant parameters including radius of coverage, product listings, and user search statistics. The merchant report may include any changes made to merchant parameters including radius of coverage and product listings.

Figure 5:
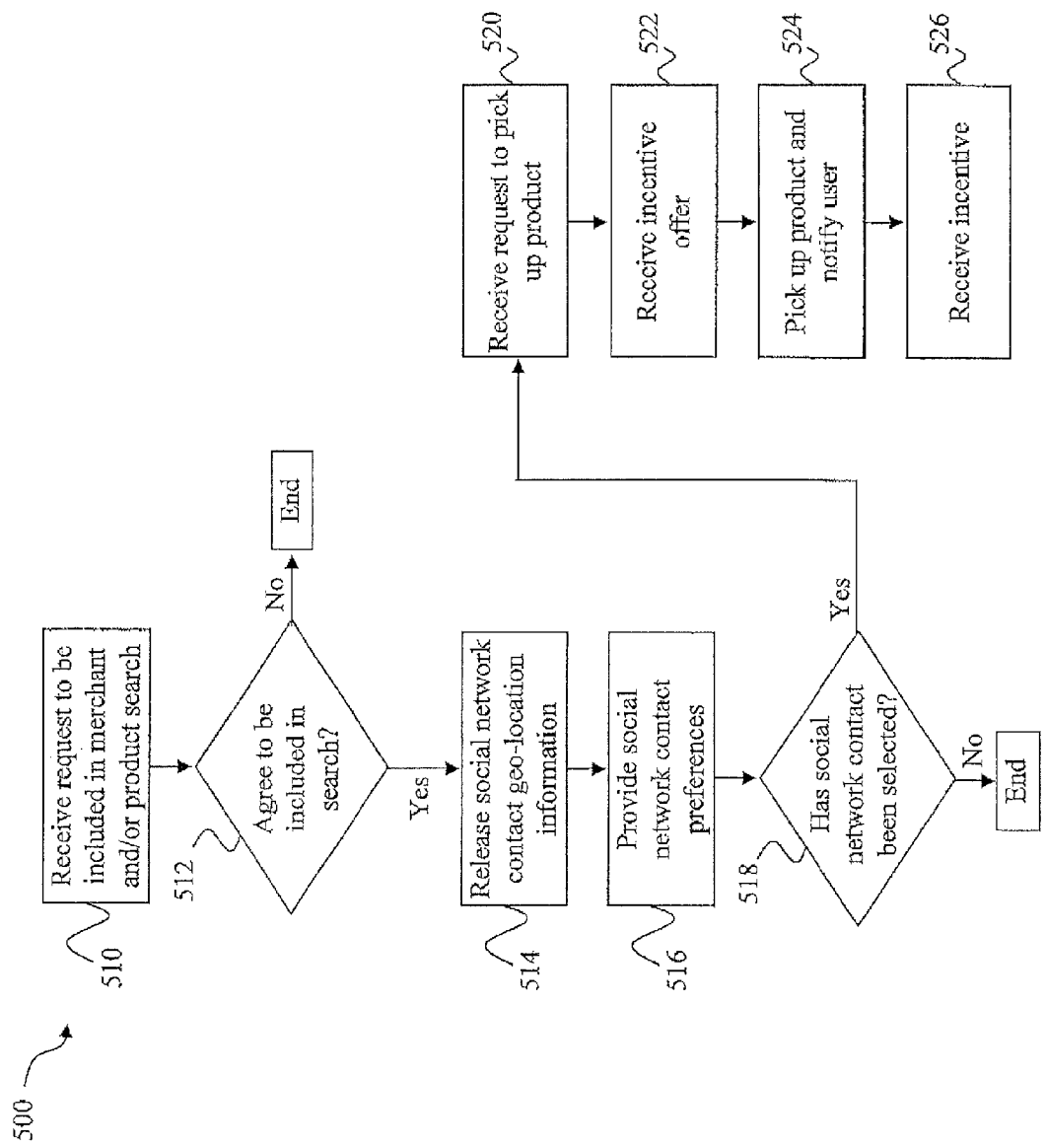
FIG. 5 shows one embodiment of a method for facilitating social network contact-side location based mobile commerce over a network, in accordance with an embodiment of the present disclosure.

FIG. 5 shows one embodiment of a method for facilitating a financial transaction (e.g., a social network contact transaction process) including location based mobile commerce over the network 110, such as the Internet via, e.g., mobile communication networks. Referring to FIGS. 1 and 5, the method 500 facilitates a user-side transaction process over the network 110. In one implementation, the social network contact interface application 162 allows the social network contact device 160 to communicate with the service provider server 180 and the user device 120 via the network 110 to conduct remote commerce, such as searching, selecting, and monitoring one or more items, products, and/or services for purchase consideration provided by the one or more of the merchant devices 140 and to communicate with the service provider server 180 to provide geo-location data, search or pickup preferences, and the like.

In one implementation, upon social network contact instruction or prompting from user device 120 or server 180, the social network contact interface application 162 may be installed and/or run on the social network contact device 160. A social network contact may run the interface application 162 on the social network contact device 160 to contact the service provider server 180 via the network 110. In one aspect, upon installation and/or execution of the interface application 162, the social network contact may be prompted to establish an account for login with the service provider server 180. When establishing a social network contact account, the social network contact may be asked to provide personal information, such as name, address, phone number, etc., and financial information, such as banking information, credit card information, etc. In another aspect, referring to FIG. 1, information related to the social network contact may be packaged as a social network contact identifier. In another implementation, a social network contact account for a social network device 160 may not be created with service provider server 180.

According to one aspect, method 500 includes social network device 160 receiving a request to be included in a merchant and/or product search from user device 120 or server 180 (block 510). The request may be received via text message, email, or various communication means and methods. The social network contact may agree to be included in the search or decline (e.g., opting in or out of the search request) (decision block 512).

Next, if the social network contact agrees to be included in the search, the social network contact releases geo-location information to the service provider server 180 by, e.g., setting release parameters (block 514). In one aspect, the social network contact geo-location information includes social network contact information related to a physical location or position of the social network contact device 160 embedded as arguments in an expression, which are passed to the service provider server 180 via the network 110. The social network contact geo-location information may include GPS coordinates (e.g., longitude and latitude) inherent to the social network contact device 160, such as a mobile cellular phone, and/or zip-code information. The social network contact geo-location information may include social network contact identifier information having dynamic arguments identifying the social network contact. The social network contact may manually set geo-location information, such as a zip code and/or longitude and latitude coordinates.

In another aspect, release parameters may be manually set by the social network contact. For example, the social network contact may allow automatic distribution of geo-location information for any query by the one or more users associated with user devices 120 or associated with the service provider server 180, or the social network contact may only allow release of geo-location information for some trusted users or service providers. For example, the social network contact may elect to grant permission to preferred users and exclude other users that the social network contact deems undesirable.

Next, if the social network contact agrees to be included in the search and releases geo-location information, the social network contact may provide social network contact preferences to the service provider server 180 (block 516). Social network contact preferences include preferences which the social network contact has related to search or pickup. For example, social network contact preferences may include distance willing to travel for a pickup of a purchased item, a black list of merchants or locations for search and/or pickup, release of social network contact calendar entries from device 160, and so forth.

In one embodiment, location based mobile commerce may be optimized based on the one or more social network contact's geo-location and preferences. For example, a user may search for items, products, and services based on geo-location information related to the user, the social network contacts, and/or the merchants, and the user's search results for intended items, products, and services to be purchased may be displayed as a merchant listing to the user via the user device 120.

Next, the social network contact may or may not be selected by a user to request a pickup of a desired item (decision block 518). If the user decides to request a pickup by the social network contact ("Yes"), the social network contact receives a request for pickup of one or more products or services (block 520). The request from user device 120 or server 180 may be received on social network contact device 160 by way of email, text message, or an automated pickup request from server 180. An incentive may or may not be offered to the social network contact (block 522). If the social network contact agrees to the pickup request, the social network contact may pick up the product and notify the user by way of email, text message, or various communication means and methods via server 180 or directly to user device 120 (block 524). An incentive may then be received (block 526) if offered at block 522. The incentive may include a money transfer to a social network contact account from a user account processed by server 180.

Figure 6:
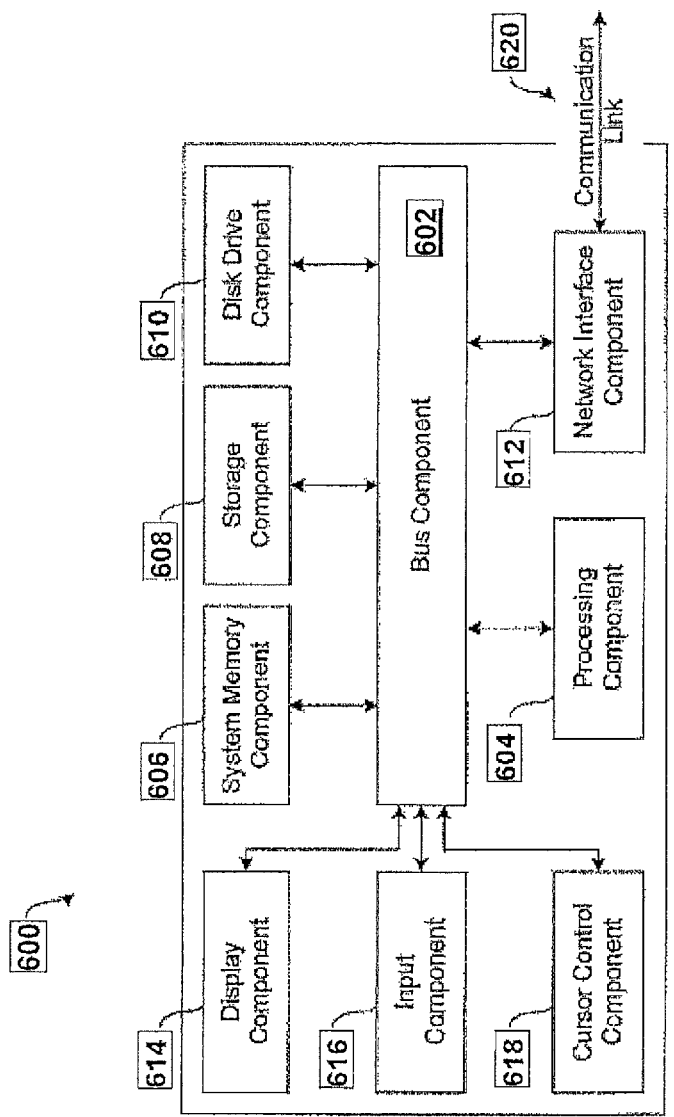
FIG. 6 is a block diagram of a computer system suitable for implementing one or more embodiments of the present disclosure.

Referring now to FIG. 6, a block diagram is illustrated of a computer system 600 suitable for implementing one or more embodiments of the present disclosure, including the user device 120, the one or more merchant devices 140, the one or more social network contact devices 160, and the service provider device 180 (e.g., a server). In various implementations, the client devices (e.g., user device 120 and network contact device 160) may comprise a personal computing device capable of communicating with the network 110, such as a personal computer, laptop, cell phone, PDA, etc., the one or more distribution channels (e.g., merchant devices 140) may comprise a network computing device, such as a network server, and the service provider device 180 may comprise a network computing device, such as a network server. Hence, it should be appreciated that each of the devices 120, 140, 160, 180 may be implemented at least in part by computer system 600 in a manner as follows.

In accordance with various embodiments of the present disclosure, computer system 600, such as a cell phone, a personal computer, and/or a network server, includes a bus 602 or other communication mechanism for communicating information, which interconnects subsystems and components, such as processing component 604 (e.g., processor, micro-controller, digital signal processor (DSP), etc.), system memory component 606 (e.g., RAM), static storage component 608 (e.g., ROM), disk drive component 610 (e.g., magnetic or optical), network interface component 612 (e.g., modem or Ethernet card), display component 614 (e.g., CRT or LCD), input component 616 (e.g., keyboard, touch screen), and cursor control component 618 (e.g., mouse or trackball). In one implementation, disk drive component 610 may comprise a database having one or more disk drive components.

In accordance with embodiments of the present disclosure, computer system 600 performs specific operations by processor 604 executing one or more sequences of one or more instructions contained in system memory component 606. Such instructions may be read into system memory component 606 from another computer readable medium, such as static storage component 608 or disk drive component 610. In other embodiments, hard-wired circuitry may be used in place of or in combination with software instructions to implement the present disclosure.

Logic may be encoded in a computer readable medium, which may refer to any medium that participates in providing instructions to processor 604 for execution. Such a medium may take many forms, including but not limited to, non-volatile media, volatile media, and transmission media. In various implementations, non-volatile media includes optical or magnetic disks, such as disk drive component 610, volatile media includes dynamic memory, such as system memory component 606, and transmission media includes coaxial cables, copper wire, and fiber optics, including wires that comprise bus 602. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instruction sequences to practice embodiments of the present disclosure may be performed by computer system 600. In various other embodiments of the present disclosure, a plurality of computer systems 600 coupled by communication link 620 (e.g., network 110 of FIG. 1, such as a LAN, WLAN, PTSN, and/or various other wired or wireless networks, including telecommunications, mobile, and cellular phone networks) may perform instruction sequences to practice the present disclosure in coordination with one another.

Computer system 600 may transmit and receive messages, data, information and instructions, including one or more programs (i.e., application code) through communication link 620 and communication interface 612. Received program code may be executed by processor 604 as received and/or stored in disk drive component 610 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Thus, the present disclosure provides for various embodiments of systems and methods for leveraging a social network to search for local inventory. In one embodiment, a method includes communicating with a first mobile communication device over a network, the first mobile communication device associated with a user, and communicating with a second mobile communication device over the network, the second mobile communication device associated with a social network contact. The method further includes obtaining a geo-location of the second mobile communication device, processing a search request from the first mobile communication device, obtaining a radius of coverage for a merchant, determining whether the geo-location of the second mobile communication device is within the radius of coverage of the merchant, and providing a listing to the first mobile communication device of one or more items for sale by the merchant when the second mobile communication device is within the radius of coverage of the merchant.

The method may further include wherein the geo-location of the second mobile communication device is obtained automatically, by permission from the social network contact, or when a geo-location of the first mobile communication device is not within the radius of coverage of the merchant.

The method may further include requesting the social network contact to pick up the one or more items for sale from a merchant location, and offering an incentive to the social network contact to accept the pickup request. In one example, the incentive may include an electronic money transfer provided when notification of pickup of the one or more items has been received.

The method may further include receiving preferences from the first mobile communication device on the social network contact, and receiving preferences from the second mobile communication device on search requests or pickup requests. The method may further include obtaining calendar data of the social network contact via the second mobile communication device.

The method may further include re-processing a search request after a time delay; communicating with a third mobile communication device over the network, the third mobile communication device associated with another social network contact; obtaining a geo-location of the third mobile communication device; and determining whether the geo-location of the second and third mobile communication devices are within the radius of coverage of the merchant.

The method may further include communicating with a plurality of mobile communication devices over the network, the plurality of mobile communication devices associated with a plurality of social network contacts, and obtaining a geo-location of each of the plurality of mobile communication devices. Then, the method may further include processing a search request from the first mobile communication device to include the plurality of social network contacts; obtaining a radius of coverage for a plurality of merchants; determining whether the geo-location of each of the plurality of mobile communication devices are within a radius of coverage of the plurality of merchants; and determining an optimized search result from the processed search request. The optimized search result may include a lowest price for a searched item.

More particularly, in one embodiment, a person's social network may be used to assist in the search for a wanted item. The person searching (searcher) (e.g., a user associated with a user device 120) may bring up a mobile search application (e.g., a user interface application 122) that would search for local item(s)/inventory. The searcher may enter the desired item(s) into the application and the application would retrieve the local GPS coordinates from the media device. The searcher may have the option to include social network friends (e.g., contacts associated with a social network contact device 160) within the search. In this case, the searcher may only use the social network friend search if they are unsuccessful with only their personal local search. However, they may also choose to automatically include the social network friend search.

The searcher may ask to include the friend's or friends' location into the item/inventory search. The friend could have a setting to automatically accept these types of searches and include their position (e.g., geo-location) in a friend search or the friend must accept the request in order to be included in the search (e.g., via a social network contact interface application 162). If the searcher's local search fails to find the item/inventory in their GPS search radius but it is found in a friend search radius the searcher may be notified. The searcher may then provide an incentive to give the friend to go and pick up the item. For example, the user application could send the friend located near the item an SMS message saying if you go pick up this item I will buy lunch or provide a PayPal money transfer once the item has been purchased.

If the social network friend is included in the item/inventory search, the friend could set preferences on search. For example, the friend is only willing to go X amount of miles out of their way to get the item. The friend can have a black list where they will not go to a particular store or location to buy an item. For example, a friend may be boycotting a particular merchant and the searcher is looking for a product from the particular merchant. The search application would see that this friend would not go to the particular merchant even if it was in their area and thus not include the friend in the social network friend search. The searcher may offer an incentive to temporarily override preferences from friends and they may be prompted with this incentive. If the friend accepts the override, their location is included in the search.

Additionally, the search application used by the searcher could be enabled to be aware of the social network friend's calendar. The application could use this information and make a decision on whether or not to include a particular friend in the search. For example, if the friend's calendar has an entry around the time of the search and it is important to the friend the application will opt not to use that friend. The application could also use general time available around calendar entries to make the determination about whether or not to use the friend in the search. In this case, for example, if the friend's calendar has an entry indicating an interview within the next hour of the search, the friend is not likely to be available to pick up the item even if it is in their location.

If the searcher was not able to find the item with the available friends in the social network at the time of the search, the application could delay the search for a specified amount of time. During the delay time the application could continue to look for friends not included in the original search. If a friend becomes available and the item is found in their area the searcher may be notified. Additionally, the application may or may not include friends that are not in a close proximity of the searcher (e.g. within the same city, etc.). However, the searcher could put a priority (how much they want it) on the item thus including friends that it may not have originally included.

As the searcher uses their social network friends for searching they could put preferences on the social network. For example, the searcher could categorize the friend who is willing to pick up items for them and the type of items. For example, a searcher may opt to not include their mom if they are searching for a special type of alcohol. The application could also automatically categorize the friends who have picked up items in the past. The searcher could use this information to indicate a willingness to help so as to not use a particular friend too much. The searcher could also specify that the item they are searching for is for a friend in their social network and to not include that friend in the social network friend search.

The search application may automatically use a social network friend search to look for the best priced deal. The searcher could specify that they are looking for the deal and to include all available social network friends. The application could compare the price(s) of the local search to the prices of the social network friends' prices. The searcher could opt for a friend to pick up the item to take advantage of a good price.

EXAMPLE

Person A wants to buy brand name vintage black leather pants for Person B. Person A user her mobile device and opens a local and friend search application. Person A enters her search criteria and searches for the product local only to her mobile device. However, she can't find the leather pants in her search radius. Person A decides to tell the search application to use her social network friends' location to search for the item but not to include Person B in the search. In doing the search leveraging her social network contacts, the application determines that her friend Person C has a merchant selling the product near person C's location. Person A sends a personalized message to person C asking if she is willing to pick up the leather pants. Person C is glad to help out and Person A pays for the pants. Person A sends Person C a thank you gift and the application notes Person C's willingness to help out.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, incentives may or may not be offered, and if offered, they may be offered at different times in the methods described above than illustrated. For example, incentives may be offered with a pickup request, only after a rejected pickup request, or not at all. Having thus described embodiments of the present disclosure, persons of ordinary skill in the art will recognize that changes may be made in form and detail without departing from the scope of the present disclosure. Thus, the present disclosure is limited only by the claims.

The invention claimed is:

1. A system comprising:
   a non-transitory memory storing account information for merchants, wherein the account information comprises a location for a merchant; and
   one or more hardware processors configured for:
      receiving a search request from a first mobile communication device associated with a user over a network;
      determining a location of a second mobile communication device, wherein the second mobile communication device is associated with a contact of the user, wherein the user and the contact are different users;
      obtaining a radius of coverage for a merchant;
      determining the location of the second mobile communication device is within the radius of coverage of the merchant;
      processing a payment request from the first mobile communication device for a purchase by the user of an item of one or more items for sale by the merchant; and
      communicating a request to the second mobile communication device associated with the contact to pick up the item at the merchant on behalf of the user.

2. The system of claim 1, wherein the one or more hardware processors is further configured for providing a listing to the first mobile communication device of one or more items for sale by the merchant.

3. The system of claim 1, wherein the location of the second mobile communication device is obtained automatically, by permission from the contact, or when a location of the first mobile communication device is not within the radius of coverage of the merchant.

4. The system of claim 1, wherein the contact is from a social network of the user.

5. The system of claim 1, wherein the contact is from a contact list of the user.

6. The system of claim 1, wherein an incentive is offered to the contact to accept the pickup request.

7. The system of claim 6, wherein the incentive is an electronic money transfer provided when notification of pickup of the item has been received.

8. The system of claim 1, wherein the one or more hardware processors is further configured for receiving preferences on the contact from the first mobile communication device and receiving preferences on search requests or pickup requests from the second mobile communication device.

9. The system of claim 1, wherein the one or more hardware processors is further configured for obtaining calendar data of the contact via the second mobile communication device.

10. The system of claim 1, wherein the one or more hardware processors is further configured for:
   re-processing the search request after a time delay;
   communicating with a third mobile communication device over the network, the third mobile communication device associated with another user contact;
   obtaining a location of the third mobile communication device; and
   determining whether the location of the second and third mobile communication devices are within the radius of coverage of the merchant.

11. The system of claim 1, wherein the one or more hardware processors is further configured for:
   communicating with a plurality of mobile communication devices over the network, the plurality of mobile communication devices associated with a plurality of user contacts;
   obtaining a location of each of the plurality of mobile communication devices;
   processing a search request from the first mobile communication device to include the plurality of user contacts;
   obtaining a radius of coverage for a plurality of merchants;

determining whether the location of each of the plurality of mobile communication devices are within a radius of coverage of the plurality of merchants; and determining an optimized search result from the processed search request.

12. The system of claim 1, wherein the one or more hardware processors is further configured for:

obtaining a location of the first mobile communication device;

determining whether the location of the first mobile communication device is within the radius of coverage of the merchant; and providing a listing to the first mobile communication device of one or more items for sale by the merchant when the first mobile communication device or the second mobile communication device is within the radius of coverage of the merchant, wherein the one or more items for sale includes a list of products or services.

13. The system of claim 1, wherein the one or more hardware processors is further configured for:

receiving one or more release parameters from the user via the first mobile communication device, the release parameters allowing release of location information from the first mobile communication device;

receiving one or more release parameters from the contact via the second mobile communication device, the release parameters allowing release of location information from the second mobile communication device;

receiving one or more search parameters from the user via the first mobile communication device, the search parameters identifying at least one specific item selected by the user; and receiving one or more merchant parameters from the merchant via a merchant device, the merchant parameters identifying the radius of coverage selected by the merchant.

14. The system of claim 1, wherein the one or more hardware processors is further configured for:

verifying the identity of the user based on user information obtained from the first mobile communication device;

verifying the identity of the contact based on contact information obtained from the second mobile communication device; and verifying the identity of the merchant based on merchant information obtained from a merchant device.

15. The system of claim 1, wherein the one or more hardware processors is further configured for:

maintaining at least one account for each of the user, the merchant, and the contact, wherein the accounts include account information related to the user, the merchant, and the contact, respectively, and wherein the account information comprises private financial information of the user, the merchant, and the contact, respectively, including at least one or more account numbers, passwords, credit card information, and banking information.

16. The system of claim 1, wherein the network comprises at least one of a mobile communication network and the Internet.

17. The system of claim 1, wherein the first and second mobile communication devices comprise cellular phones.

18. A non-transitory computer readable storage medium comprising computer readable instructions which when executed by a computer cause the computer to perform the operations of:

receiving a search request from a first mobile communication device associated with a user over a network;

determining a location of a second mobile communication device, wherein the second mobile communication device is associated with a contact of the user, wherein the user and the contact are different users;

obtaining a radius of coverage for a merchant;

determining the location of the second mobile communication device is within the radius of coverage of the merchant;

processing a payment request from the first mobile communication device for a purchase by the user of an item of one or more items for sale by the merchant; and communicating a request to the second mobile communication device associated with the contact to pick up the item at the merchant on behalf of the user.

19. The non-transitory computer readable storage medium of claim 18, wherein the operations further comprise:

re-processing the search request after a time delay;

communicating with a third mobile communication device over the network, the third mobile communication device associated with another user contact;

obtaining a location of the third mobile communication device; and determining whether the location of the second and third mobile communication devices are within the radius of coverage of the merchant.

20. A method comprising:

receiving, by a hardware processor of a service provider, a search request from a first mobile communication device associated with a user over a network;

determining, by the hardware processor, a location of a second mobile communication device, wherein the second mobile communication device is associated with a contact of the user, wherein the user and the contact are different users;

obtaining, by the hardware processor, a radius of coverage for a merchant;

determining, by the hardware processor, the location of the second mobile communication device is within the radius of coverage of the merchant;

processing, by the hardware processor, a payment request from the first mobile communication device for a purchase by the user of an item of one or more items for sale by the merchant; and communicating, electronically by the hardware processor, a request to the second mobile communication device associated with the contact to pick up the item at the merchant on behalf of the user.

* * * * *